US008909642B2

(12) United States Patent
Carasso et al.

(10) Patent No.: US 8,909,642 B2
(45) Date of Patent: *Dec. 9, 2014

(54) AUTOMATIC GENERATION OF A FIELD-EXTRACTION RULE BASED ON SELECTIONS IN A SAMPLE EVENT

(71) Applicant: Splunk Inc., San Francisco, CA (US)

(72) Inventors: R. David Carasso, San Rafael, CA (US); Micah James Delfino, San Francisco, CA (US); Johnvey Hwang, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,306

(22) Filed: Jan. 23, 2013

(65) Prior Publication Data
US 2014/0207792 A1 Jul. 24, 2014

(51) Int. Cl.
G06F 17/30 (2006.01)
(52) U.S. Cl.
CPC .............................. *G06F 17/30386* (2013.01)
USPC ............ 707/736; 715/808; 715/823; 715/826
(58) Field of Classification Search
USPC ................... 707/736, 739; 715/808, 823, 826
See application file for complete search history.

(56) References Cited

U.S. PATENT DOCUMENTS

| 6,049,777 | A | 4/2000 | Sheena et al. |
| 6,112,186 | A | 8/2000 | Bergh et al. |
| 6,374,251 | B1 | 4/2002 | Fayyad et al. |
| 6,954,756 | B2 | 10/2005 | Arning et al. |
| 7,389,306 | B2 | 6/2008 | Schuetze et al. |
| 7,805,482 | B2 | 9/2010 | Schiefer |
| 7,958,164 | B2 | 6/2011 | Ivanov et al. |
| 8,022,987 | B2 | 9/2011 | Ko et al. |
| 8,543,379 | B1 * | 9/2013 | Michelsen ........................ 704/9 |
| 2002/0049740 | A1 | 4/2002 | Arning et al. |
| 2002/0133513 | A1 | 9/2002 | Townsend et al. |
| 2003/0061212 | A1 | 3/2003 | Smith et al. |
| 2004/0010497 | A1 | 1/2004 | Bradley et al. |
| 2004/0148154 | A1 * | 7/2004 | Acero et al. ....................... 704/1 |
| 2004/0148170 | A1 * | 7/2004 | Acero et al. .................. 704/257 |
| 2005/0022207 | A1 * | 1/2005 | Grabarnik et al. ............. 719/313 |

(Continued)

OTHER PUBLICATIONS

"iTunes for Mac: Create a Smart Playlist," Apple, Nov. 27, 2012 http://supportapple.com/kb/PH1739?viewlocale=en_US.

(Continued)

*Primary Examiner* — Dennis Truong
(74) *Attorney, Agent, or Firm* — Haynes Beffel & Wolfeld LLP; Ernest J. Beffel, Jr.

(57) ABSTRACT

Embodiments are directed towards automatically generating extraction rules for extracting fields from event records. An extraction rule application receives field data describing the fields to be extracted (including one or more examples) and a collection of event records that may be a representative sample set from a larger set of events records. The extraction rule application generates extraction rules based on the event records and the field data. These extraction rules may be ranked using a determined quality score. Quality scores for extraction rules may be determined based on various metrics related to the operation of the extraction rules and the resultant extracted values. Preferred extraction rules may be determined by ranking the extraction rules based on their quality scores. Also, natural language expressions may be used to create, edit, or modify extraction rules.

30 Claims, 12 Drawing Sheets

(56) References Cited

U.S. PATENT DOCUMENTS

| | | | |
|---|---|---|---|
| 2005/0065967 | A1 | 3/2005 | Schuetze et al. |
| 2006/0053174 | A1* | 3/2006 | Gardner et al. ............... 707/203 |
| 2006/0112123 | A1 | 5/2006 | Clark et al. |
| 2006/0136194 | A1* | 6/2006 | Armstrong et al. ............... 704/4 |
| 2006/0161564 | A1* | 7/2006 | Pierre et al. .................. 707/100 |
| 2006/0173917 | A1 | 8/2006 | Kalmick et al. |
| 2006/0259519 | A1* | 11/2006 | Yakushev et al. ............. 707/201 |
| 2006/0265397 | A1 | 11/2006 | Bryan et al. |
| 2007/0003146 | A1 | 1/2007 | Ko et al. |
| 2007/0239694 | A1 | 10/2007 | Singh et al. |
| 2008/0301095 | A1 | 12/2008 | Zhu et al. |
| 2008/0306980 | A1 | 12/2008 | Brunner et al. |
| 2008/0320033 | A1 | 12/2008 | Koistinen et al. |
| 2009/0094207 | A1 | 4/2009 | Marvit et al. |
| 2009/0177689 | A1 | 7/2009 | Song et al. |
| 2009/0287628 | A1 | 11/2009 | Indeck et al. |
| 2009/0287680 | A1 | 11/2009 | Paek et al. |
| 2010/0106743 | A1 | 4/2010 | Brunner et al. |
| 2010/0138377 | A1 | 6/2010 | Wright et al. |
| 2011/0010685 | A1* | 1/2011 | Sureka et al. .................. 717/102 |
| 2011/0040724 | A1 | 2/2011 | Dircz |
| 2011/0219035 | A1 | 9/2011 | Korsunsky et al. |
| 2011/0276695 | A1 | 11/2011 | Maldaner |
| 2011/0320450 | A1 | 12/2011 | Liu et al. |
| 2012/0089562 | A1* | 4/2012 | Deremigio et al. ........... 707/602 |
| 2012/0101975 | A1 | 4/2012 | Khosravy |
| 2012/0117079 | A1 | 5/2012 | Baum et al. |
| 2012/0226779 | A1 | 9/2012 | Crucs |
| 2012/0311467 | A1* | 12/2012 | Bijani et al. ................... 715/760 |
| 2013/0019019 | A1 | 1/2013 | Lam |
| 2013/0054660 | A1 | 2/2013 | Zhang |
| 2013/0060937 | A1 | 3/2013 | Bath et al. |
| 2013/0073542 | A1 | 3/2013 | Zhang et al. |
| 2013/0080190 | A1 | 3/2013 | Mansour et al. |
| 2013/0173322 | A1 | 7/2013 | Gray |

OTHER PUBLICATIONS

"RegexBuddy Demo—Self-Running Demonstration," RegexBuddy.com, Oct. 28, 2012 http://www.regexbuddy.com/democreate.html.

Carasso, D., "Exploring Splunk: Search Processing Language (SPL) Primer and Cookbook," Splunk, Apr. 2012.

Carasso, D., "Semi-Automatic Discovery of Extraction Patterns for Log Analysis," 2007.

Riloff, E. et al., "Learning Dictionaries for Information Extraction by Multi-Level Bootstrapping," Proceedings of the Sixteenth National Conference on Artificial Intelligence, Jul. 1999.

Soderland, S. et al., "Issues in Inductive Learning of Domain-Specific Text Extraction Rules," Proceedings of the Workshop on New Approaches to Learning for Natural Language Processing at the Fourteenth International Joint Conference on Artificial Intelligence, Aug. 1995.

Non-Final Office Action of Apr. 30, 2013 for U.S. Appl. No. 13/747,177, 18 pages.

Non-Final Office Action of May 22, 2013 for U.S. Appl. No. 13/747,153, 26 pages.

Non-Final Office Action of Aug. 2, 2013 for U.S. Appl. No. 13/748,391, 10 pages.

Non-Final Office Action of Jun. 5, 2013 for U.S. Appl. No. 13/748,313, 22 pages.

Non-Final Office Action of May 2, 2013 for U.S. Appl. No. 13/748,360, 17 pages.

Final Office Action of Sep. 13, 2013 for U.S. Appl. No. 13/747,177, 17 pages.

Final Office Action of Sep. 16, 2013 for U.S. Appl. No. 13/748,360, 19 pages.

Final Office Action of Sep. 26, 2013 for U.S. Appl. No. 13/748,313, 13 pages.

Carasso, David. Field Extractor App (Walkthrough) [online video excerpts]. YouTube, Jul. 12, 2013 [retrieved on Jun. 17, 2014]. Retrieved from the Internet <URL: https://www.youtube.com/watch?v=Gfl9Cm9v64Y>. pp. 1-18.

* cited by examiner

AUTOMATIC GENERATION OF A FIELD-EXTRACTION RULE BASED ON SELECTIONS IN A SAMPLE EVENT

TECHNICAL FIELD

This invention relates generally to information organization, search, and retrieval and more particularly, but not exclusively, to automatically generating extraction rules for fields included in event records.

BACKGROUND

The rapid increase in the production and collection of machine-generated data has created large data sets that are difficult to search. The machine data can include sequences of time stamped records that may occur in one or more usually continuous streams. Further, machine data often represents activity made up of discrete events.

Often, search engines may receive data from various data sources, including machine data. In some cases, this data may be analyzed or processed in a variety of ways. However, prior to such processing, field values may need to be extracted from the received data. Sometimes the received data may be unstructured, which may make it difficult for systems to efficiently analyze the received data to determine what data may be of interest and/or how to generate a field value extraction rule. This may be especially true where the datasets are considered extremely large, such as terabytes or greater. Such large unstructured datasets may make it difficult and time consuming to analyze the data so as to be able to perform various actions on the data. For example, determining extraction rules, modification rules, or the like on such large datasets that are correct and effective may be difficult and time consuming. Improper and/or ineffective rules may result in improper value from the received data and/or omit significant values. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein.

DETAILED DESCRIPTION OF THE DRAWINGS

Figure 1:
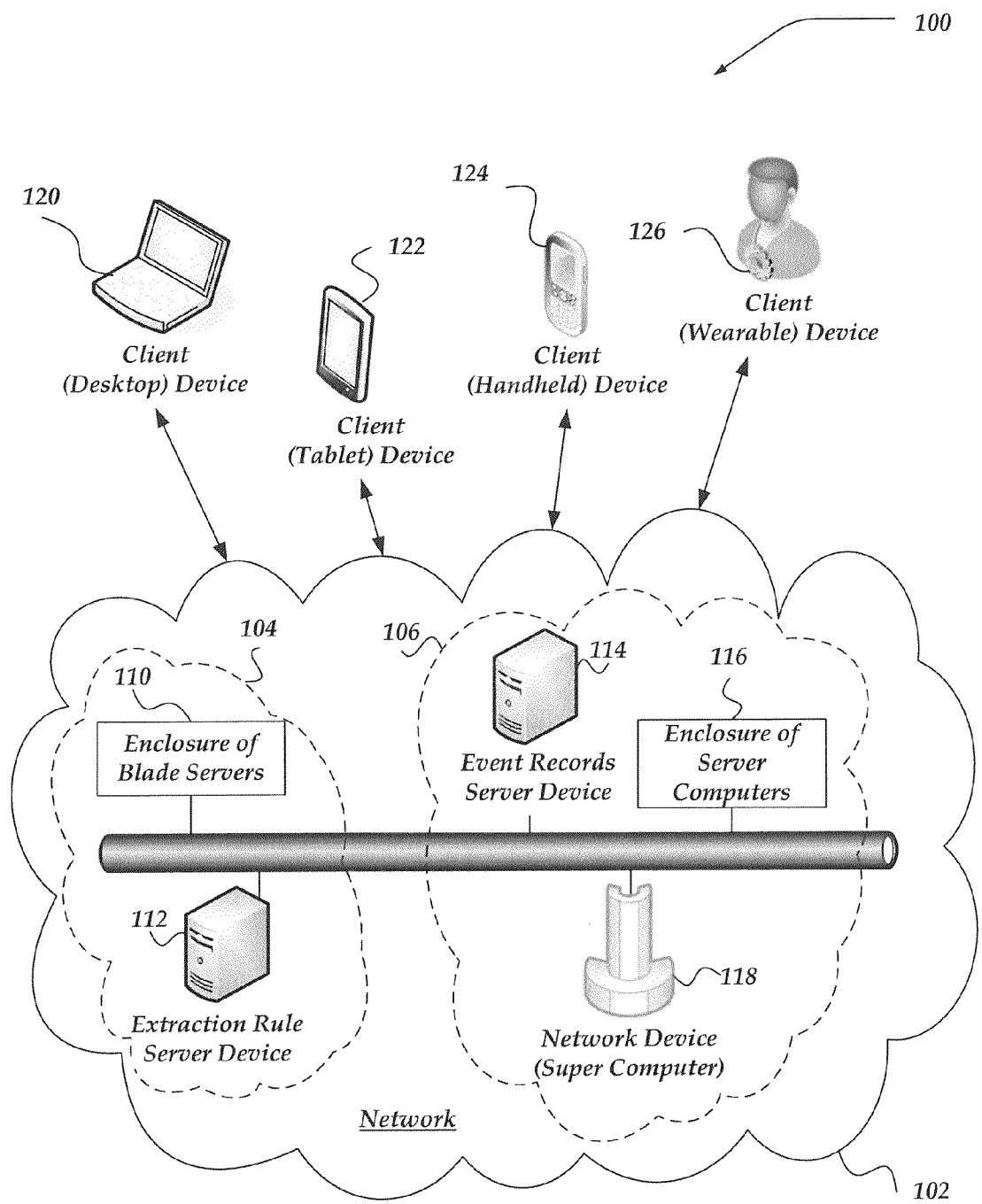
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "time series data" as used herein is data where each data record has a timestamp associated with it. A "Time Series Search Engine" is a search engine which, in at least one of the various embodiments, can perform queries limited by a time range (such as between one time and another, or data earlier than a given time, or the like) on the stored data and/or generate results ordered by time and/or timestamps (such as from earliest-to-latest or vice versa).

The term "data repository" as used herein refers to data sources that may contain unstructured or structured data, such as databases, file systems, search engine indexes, or the like. In at least one of the various embodiments, a data repository may be a live stream of data. In other cases, a data repository may be static data, or a combination of live data or static data. In at least one of the various embodiments, data repositories may provide interfaces such as, application programming interfaces (API) for receiving requests, queries regarding the data stored in the data repository.

The term "configuration information" as used herein refers to data and/or directives that may be employed by an application for performing action, such as indexing, transforming, and/or interpreting data received from data sources. Configuration information may be saved using various storage mechanisms, such as, file systems, databases, computer memory, or the like.

Configuration information may include rules that may be comprised of extraction rules, filters, matching functions, rules for determining "event boundaries" within received data (e.g., rules for dividing an event stream into individual lines, rules for merging lines into multi-line events, or the like), rules for locating and parsing timestamps, or the like. The configuration information may be employed by an application to identify events of interest that may be included in machine-generated data, identify and extract fields within events, or the like.

The term "regular expression" as used herein refers to a sequence of constants and operators arranged into expressions for matching a set of strings. A regular expression is often defined as a pattern matching language which can be employed to identify character strings, for example, to select specific strings from a set of character strings. More particularly, regular expressions are often defined as a context-independent syntax that can represent a wide variety of character sets and character set orderings. In operation, regular expressions can be employed to search data based upon a predefined pattern or set of patterns. As such, this pattern matching language employs a specific syntax by which particular characters or strings are selected from a body of text. Although simple examples of regular expressions can be easily understood, oftentimes, the syntax of regular expressions are so complex that even the most experienced programmers have difficulty in understanding them. Regular expressions may be constructed using a variety of computer languages and constructs. In addition to matching, some regular expression systems offer functionality, such as, substitution, grouping, back references, or the like. Regular expressions and regular expression systems may be adapted to work with non-string data providing matching facilities for binary data.

The term "event record" may refer to computing data that is collected about an event for a computing system, including, for example, an action, characteristic, condition (or state) of the computing system. For example, such events may be about a computing system's performance, actions taken by the computing system, or the like. Event records may be obtained from various computing log files generated by the computer's operating system, and/or other monitoring application. However, event records are not restricted by a file format or structure from which the event data is obtained. In various embodiments, event records may include structured and/or structured machine data.

The term "extraction rule" and/or "data field extraction rule" may refer to instructions that may be applied to identify and extract field values from data, such as event records. In some embodiments, an extraction rule may define a field within event records from which to extract a value. In at least one of various embodiments, the extraction rules may include regular expressions. The data from which extraction rules may be applied may include data such as structured and/or unstructured machine data, indexed data, event records, or other type of data.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards systems, apparatus, and methods for automatically generating extraction rules for extracting fields from event records. An extraction rule application may receive field data describing the fields to be extracted (including one or more example values for the fields) and a collection of event records. In at least one of the various embodiments, the received event records may be a representative sample set from a larger set of events records.

In at least one of the various embodiments, the extraction rule application may generate one or more extraction rules based on the event records and the field data. These generated extraction rules may be ranked using a determined quality score. In at least one of the various embodiments, quality scores for extraction rules may be determined based on various metrics related to the operation of the extraction rules and the resultant extracted values. In at least one of the various embodiments, one or more preferred extraction rules may be determined by ranking the extraction rules based on their quality scores. Also, in at least one of the various embodiments, natural language expressions may be used to create, edit, or modify extraction rules.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include extraction rule server device 112, event records server device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, extraction rule server device 112 may include module, processes, components, services, or the like, for generating extraction rules for extracting fields from event records. Further, in at least one of the various embodiments, indexing server 114 may include processes, modules, services, components, or the like, for collecting and indexing data event records and event records.

In at least one of the various embodiments, indexing server 114 may employ extraction rules provided by extraction rule server 112 if indexing events, or other forms of data.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HISDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
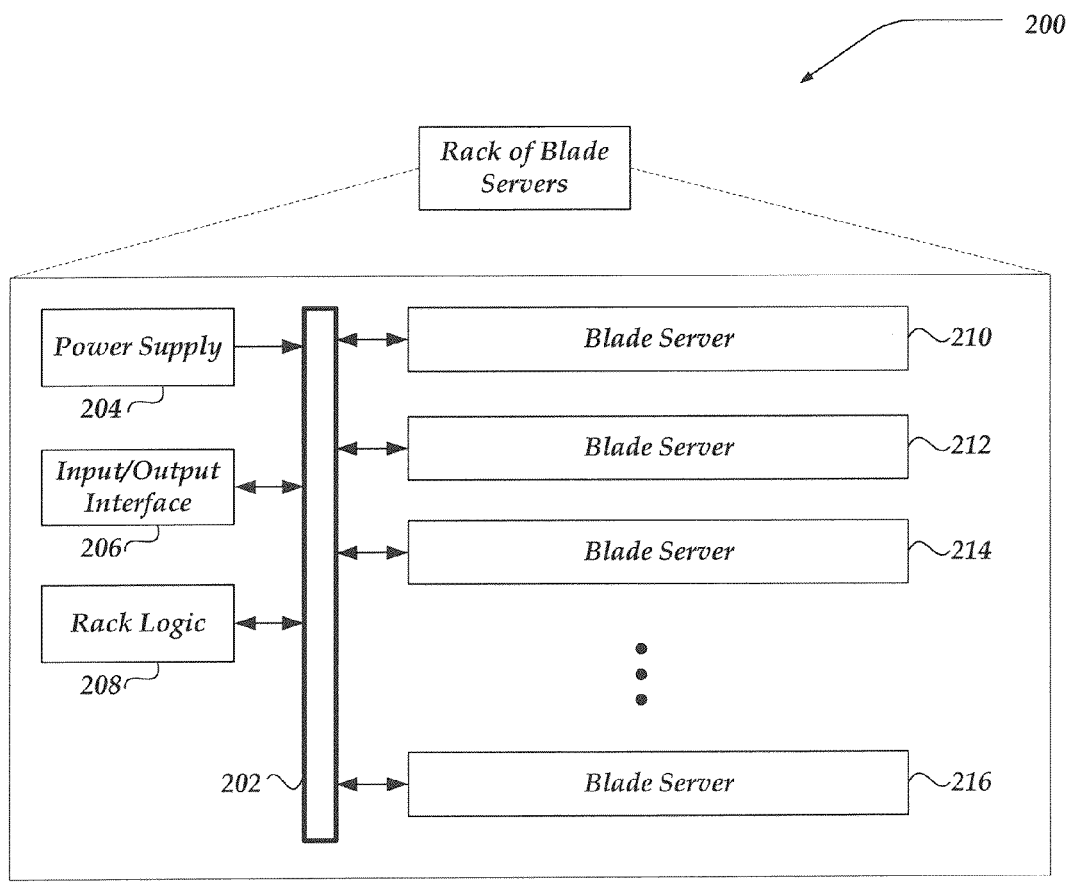
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
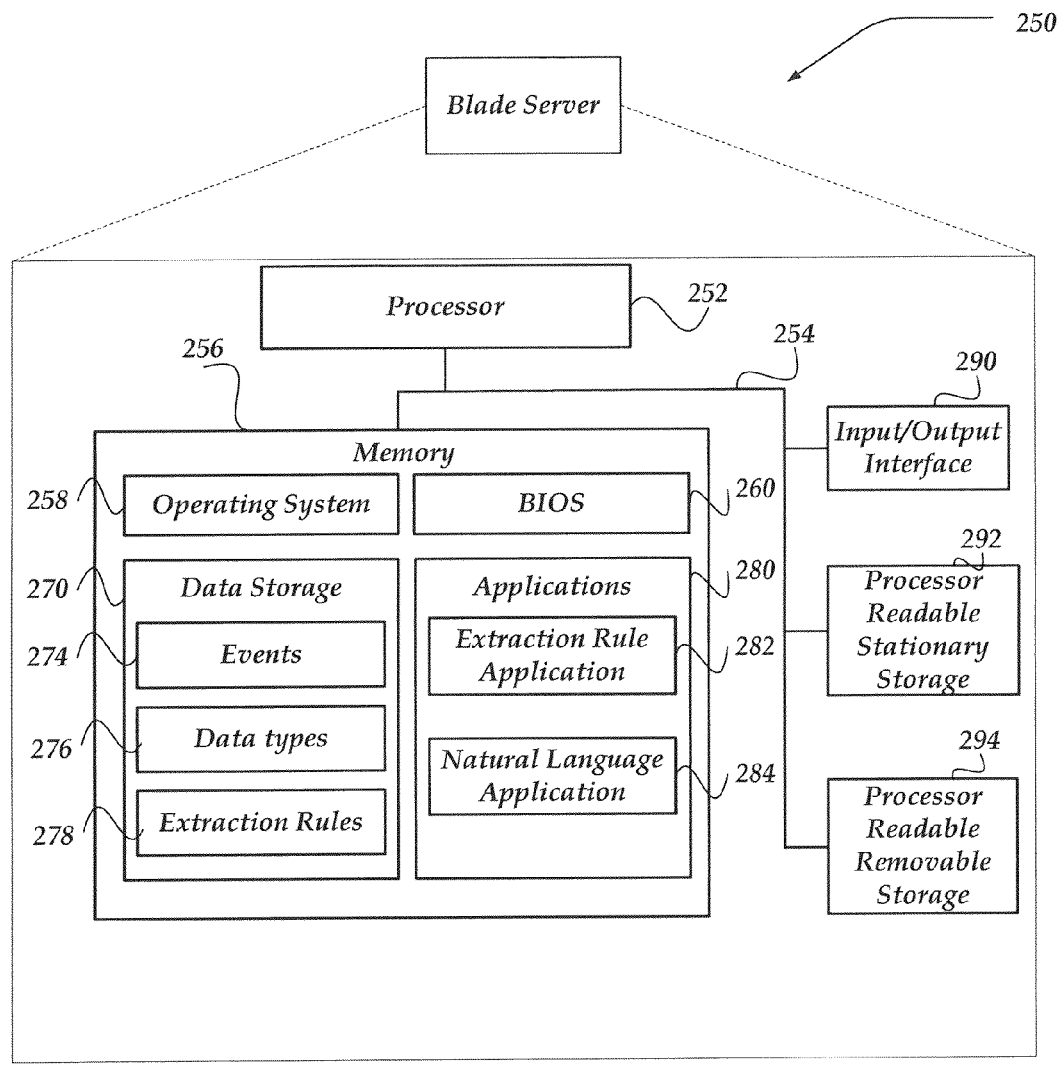
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, example events 274, data types 276, extraction rules 278, or the like.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, extraction rule application 282, and natural language application 284 which may be enabled to perform actions further described below in conjunction with FIGS. 5-11.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
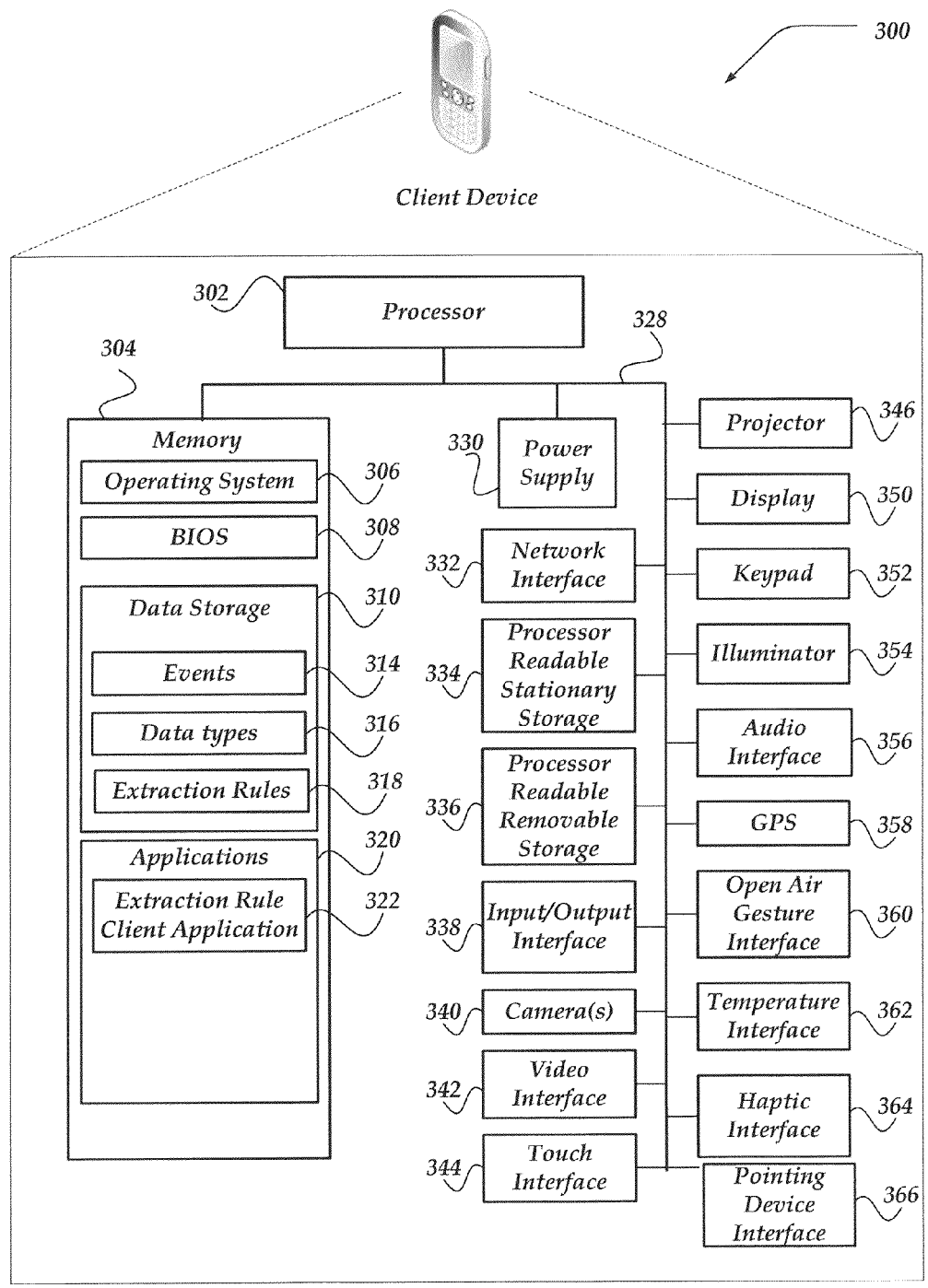
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device. Data storage 310 may include, for example, events 314, field data types 316, or extraction rules 318.

Applications 320 may include computer executable instructions which, when executed by mobile device 300, transmit, receive, and/or otherwise process instructions and data. Applications 320 may include, for example, extraction rule client application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
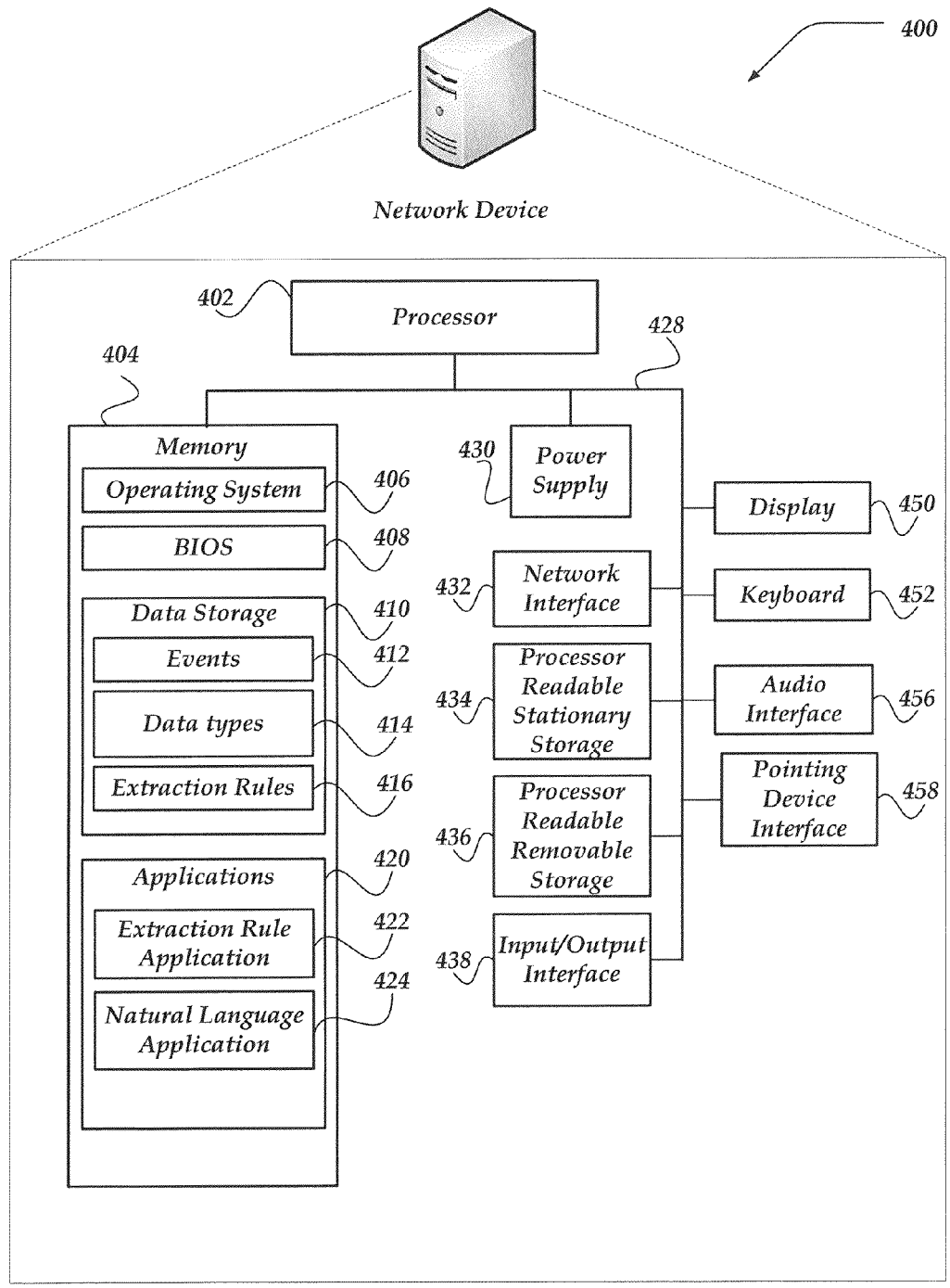
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, example events records 412, field data types 414, or extraction rules 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include extraction rule application 422, and natural language application 424 which may be enabled to perform actions further described below in conjunction with FIGS. 5-11. In at least one of the various embodiments, while they may be illustrated here as separate applications, extraction rule application 422 and/or natural language application 424 may be implemented as modules and/or components of the same application. Further, in at least one of the various embodiments, extraction rule application 422 and/or natural language application may be implemented as operating system extensions, modules, plugins, or the like.

Illustrative Extraction Rule Generation Architecture

Figure 5:
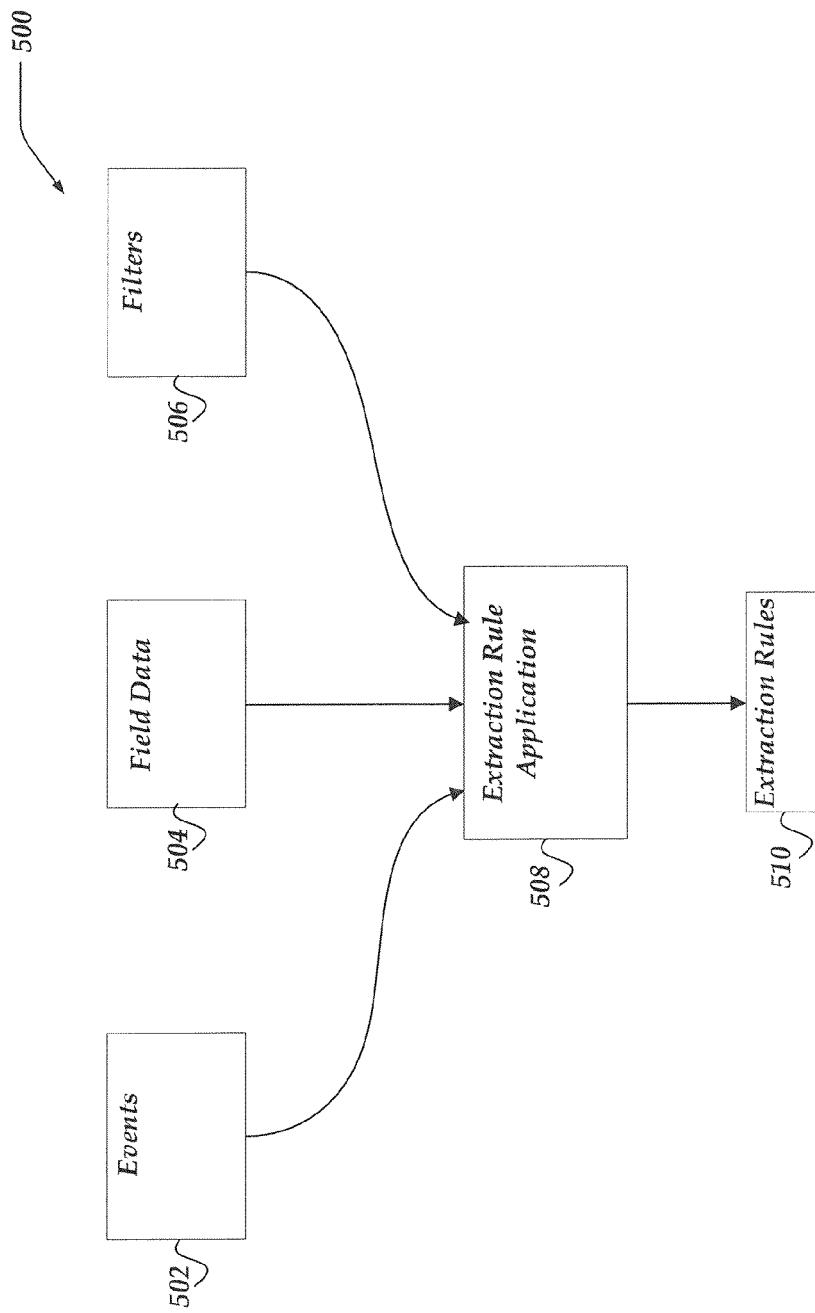
FIG. 5 illustrates a portion of a logical architecture for generating extraction rules in accordance with at least one of the various embodiments.
Figure 6:
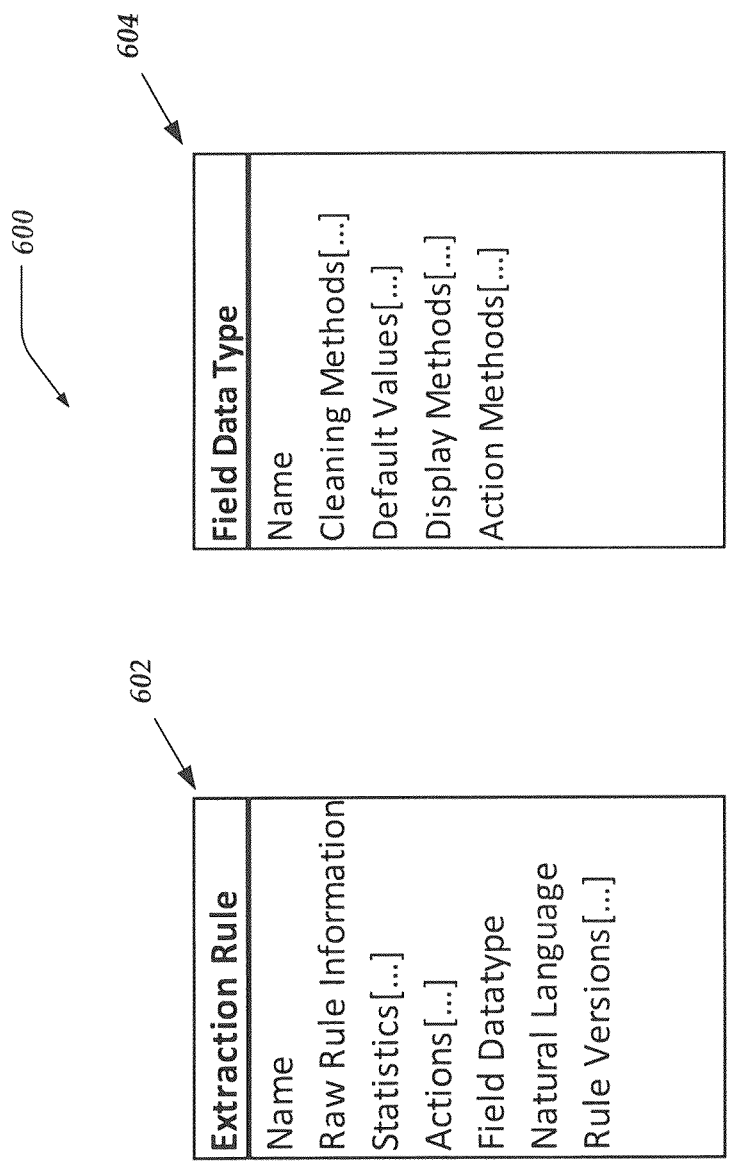
FIG. 6 illustrates a portion of a logical data model for generating extraction rules in accordance with at least one of the various embodiments.

FIGS. 5-6 represent portions of a logical architecture for automatically generating extraction rules in accordance with at least one of the various embodiments.

In at least one of the various embodiments, extraction rules may include computer instructions in the form of regular expressions, object code, source code, or the like, that may be used for extracting field values from event records. In at least one of the various embodiments, an extraction rule application may automatically generate extraction rules targeted towards extracting particular (selected) fields and values.

FIG. 5 illustrates a portion of logical architecture 500 for generating extraction rules in accordance with at least one of the various embodiments. In at least one of the various embodiments, events 502, field data 504, filters 506, may be provided to extraction rule application 508. In at least one of the various embodiments, extraction rule application 508 may generate one or more extraction rules 510 based on at least events 502, field data 504, and/or filters 506.

In at least one of the various embodiments, events 502 may include machine data (e.g., system log records, Apache access logs, or the like). In other embodiments, events 502 may include structured data produced from sources such as SQL databases, spread sheet applications, or the like. In at least one of the various embodiments, events 502 may be a representative sample selected from a portion of larger data set. Also, in at least one of the various embodiments, events 502 may include a portion of a larger data set up to and including all events in the data source.

In at least one of the various embodiments, field data 504 may include one or more examples of the fields that a user may have selected to extract from the events (e.g., example data). In at least one of the various embodiments, additional meta-data that relates to the field of interest may also be provided. This meta-data may include positional information (e.g., the location where the example field data was located inside an event record), minimum field length/size, maximum field length/size, or the like.

In at least one of the various embodiments, filters 506 may include patterns used by extraction rule application 508 for excluding or including events records. Filters 506 may be employed by extraction rule application 508 to generate extraction rules or portions of extraction rules that include or exclude matches based on the value of the filters. For example, in at least one of the various embodiments, if filter 506 includes a literal string such as "WARN" extraction rule application 508 may generate extraction rules (or partial extraction rules) that match events records that include the string "WARN." Also, filters 506 may be comprised of regular expressions as well, such as, "[A-Z]+" for matching events records that include at least one all-capital letter (all-caps) word.

In at least one of the various embodiments, extraction rule application 508 may be comprised of one or more modules that may be arranged to generate extraction rules 510 directed towards extracting one or more fields from event records. In at least one of the various embodiments, extraction rule application 508 may employ learning processes for generating extraction rules. Such learning processes may be arranged to perform actions, such as, generating extraction rules, evaluating extraction rules, scoring extraction rules (e.g., determining extraction rule quality scores), modifying extraction rules, or the like. In at least one of the various embodiments, algorithmic methods, heuristic methods, or a combination thereof may be employed by processes that generate extraction rules.

In at least one of the various embodiments, extraction rules 510 may include one or more extraction rules generated by extraction rule application 508. Each extraction rule may be generated by extraction rule application 508 based on events 502, field data 504, and optionally filters 506. In at least one of the various embodiments, extraction rules 510 may include pattern matching instructions comprised of regular expressions, object code, source code, meta-data, or a combination thereof, In at least one of the various embodiments, logical architecture 500 may be included in various components of extraction rule server device 112, including, extraction rule application 422, extraction rule application 282, or the like.

FIG. 6 illustrates a portion of logical data model 600 for generating extraction rules in accordance with at least one of the various embodiments. One of ordinary skill in the art will appreciate that a data model for a data field extraction system may include more or less data elements than those shown in data model 600. Likewise, in at least one of the various embodiments, the data elements shown in data model 600 may be combined together and/or the data model elements may be arranged to include properties other than those shown in data model 600. However, data model 600 is sufficient to enable one of ordinary skill in the art to practice the claimed subject matter and the various embodiments.

In at least one of the various embodiments, extraction rule 602 may include one or more properties such as, name, raw rule information, statistics, actions, field data type, natural language expression, rule versions, or the like. In at least one of the various embodiments, the name property may be a human readable label or description of the extraction rule.

In at least one of the various embodiments, raw rule information in extraction rule 602 may include a low level (source code or compiled) representation of an instance of an extraction rule. In at least one of the various embodiments, raw rule information may be expressed in regular expressions, computer programming languages, or the like. In at least one of the various embodiments, raw rule information may be in a source code format and/or it may be in a compiled form.

In at least one of the various embodiments, one or more statistical properties associated with extraction rule 602 may describe how a particular instance of an extraction rule performed over a set of events. In at least one of the various embodiments, statistics may include the number of matches for the extraction rule, the percentage of matches for the extraction rule, top extractions for the extraction rule, or the like.

In at least one of the various embodiments, the actions property may include references to one or more actions that may be performed on the extraction rules. Actions may include enhanced/increased testing of the extraction rule (e.g., executing the rule against larger and/or different event record sets), showing all the values that were extracted by the rule, methods for storing the extraction rule, deleting or discarding the rule, editing the rule, or the like.

In at least one of the various embodiments, actions may also correspond to user-interface elements such as buttons, links, or the like. In at least one of the various embodiments, actions may be computer-readable references such as, callbacks, function pointers, closures, or the like.

In at least one of the various embodiments, an extraction rule can extract multiple fields, each which can have a data type. For example, a regular expression "(?<val1>\d+) (?<val2>\s+\d)" will extract out two fields—val1 and val2— each which can have an optional data type to limit it, such as "errorid" and "product code".

In at least one of the various embodiments, the natural language property may include (or reference) a natural language representation of the extraction rule. In at least one of the various embodiments, if multiple natural languages are supported, the natural language property may include references to one or more of the supported natural languages.

In at least one of the various embodiments, rule versions may include one or more references to previous versions of an extraction rule.

In at least one of the various embodiments, field data type 604 may include one or more properties such as, name, cleaning methods, defaults values, display methods, action methods, or the like.

In at least one of the various embodiments, the name property may be a human readable label or description of the field data type. For example, field data type names may include, phone-number, age, postal code, Boolean, or the like.

In at least one of the various embodiments, cleaning methods may include one or more defined actions for modifying extracted data to expected and/or desired values. In at least one of the various embodiments, cleaning methods may include converting from erroneous or noisy results to one or more legal results. Thus, in at least one of the various embodiments, cleaning methods may be defined for correcting errors in extracted fields (e.g., spelling errors, case errors, or the like). In at least one of the various embodiments, cleaning methods may be defined for mapping and/or converting from one set of correct values to another set of values.

In at least one of the various embodiments, legal values for a field data type may be specified by a user or other well-known configuration methods. In at least one of the various embodiments, legal values may be assigned using a list of literal values, such as, 'red', 'blue', and 'green'. Also, in at least one of the various embodiments, legal values may be assigned using patterns (e.g., regular expressions), or numeric ranges (e.g., "0-10", "20-30", or the like).

In at least one of the various embodiments, one or more methods for automatically converting from extracted values to correct/legal field values may be associated with a field data type. In at least one of the various embodiments, the conversion methods may be employed singly or in combination to produce conformed legal values.

In at least one of the various embodiments, a measure of distance from illegal field values to a legal value may be used to determine if a value should be converted, such that "ted" would be converted to "red", "feen" to green", and "bleu" to "blue". In at least one of the various embodiments, a distance function may be a weighted "edit distance" that takes into account several metrics such as keyboard distance and phonetic distance. A weighted "edit distance" is the distance in which replacements, deletions, insertions, and transpositions have a cost associated with them. In at least one of the various embodiments, the cost may take into account keyboard distance between keys and phonetic distance.

In at least one of the various embodiments, conversion methods may include a user-defined mapping from common illegal (e.g., "nope") field values to legal values. For example, a cleaning rule may be assigned to convert from values of "nope", "no", "negative" to "Declined".

In at least one of the various embodiments, conversion methods may include numeric processing, such as, formatting, unit/currency conversion, rounding, or the like. For example, a conversion rule may be defined to convert an illegal value of 11 to a legal value of 10.

In at least one of the various embodiments, default values for field data types may be specified to be applied if an extracted field value is an illegal value. For example, if a valid range of a field data type is 0-10, a value of 31 may be converted to the closest value "10" or it could be specified as being unreliable and the value set to 5. Generally, if an illegal value is within a threshold distance of a legal value, it may be changed to the closest legal value or a default value, or be left alone.

In at least one of the various embodiments, legal values may be auto-discovered based on statistical methods, such as, the N most common values (e.g., 20 most common values), the most common values needed to cover 95% of all data 3), combinations thereof, or the like.

In at least one of the various embodiments, the determination of the most common values may take into account numeric, phonetic information, and lexicographic information, such that "Yes" and "Yea" may not take up two positions of legal values, even if they were common, because of their lexical similarity.

In at least one of the various embodiments, the values and may be clustered using a similarity metric. For example, a clustering method may examine trigrams (all three-character adjacent characters) and cluster them based on their similarity to other values. For example, "audi" and "audio" have "au", "aud", "udi" trigrams in common, and may be clustered together, suggesting the less common value (e.g., "audi") be replaced with the more common value (e.g. "audio").

In at least one of the various embodiments, the display property for a field data type may enable a user to determine how a field data type value may be displayed in reports and/or user interfaces. For example, a numeric field value that is associated with a numeric field data type may be designated for representation as a graphic, such as a bar or a particular color; an image URL that may be represented as an inline image, or the like.

In at least one of the various embodiments, the user may be enabled to specify a list of actions that may be applied to field data type values. In at least one of the various embodiments, each extracted field value, may be associated with one or more actions. For example, for a field that has a data type of "IP Address", an action may be specified to "ping" the IP addresses that are extracted. Likewise, for a phone number field data type, a specified action may be to call or send a SMS message to the phone number. In at least one of the various embodiments, a user-interface may generate the appropriate action interfaces (such as clickable menu entries) based on the actions associated with a field data type.

In at least one of the various embodiments, data model 600 may be included in various components of extraction rule server device 112, including, extraction rule application 422, extraction rule application 282, or the like.

Illustrative User Interface for Natural Language Editing of Extraction Rules

Figure 7:
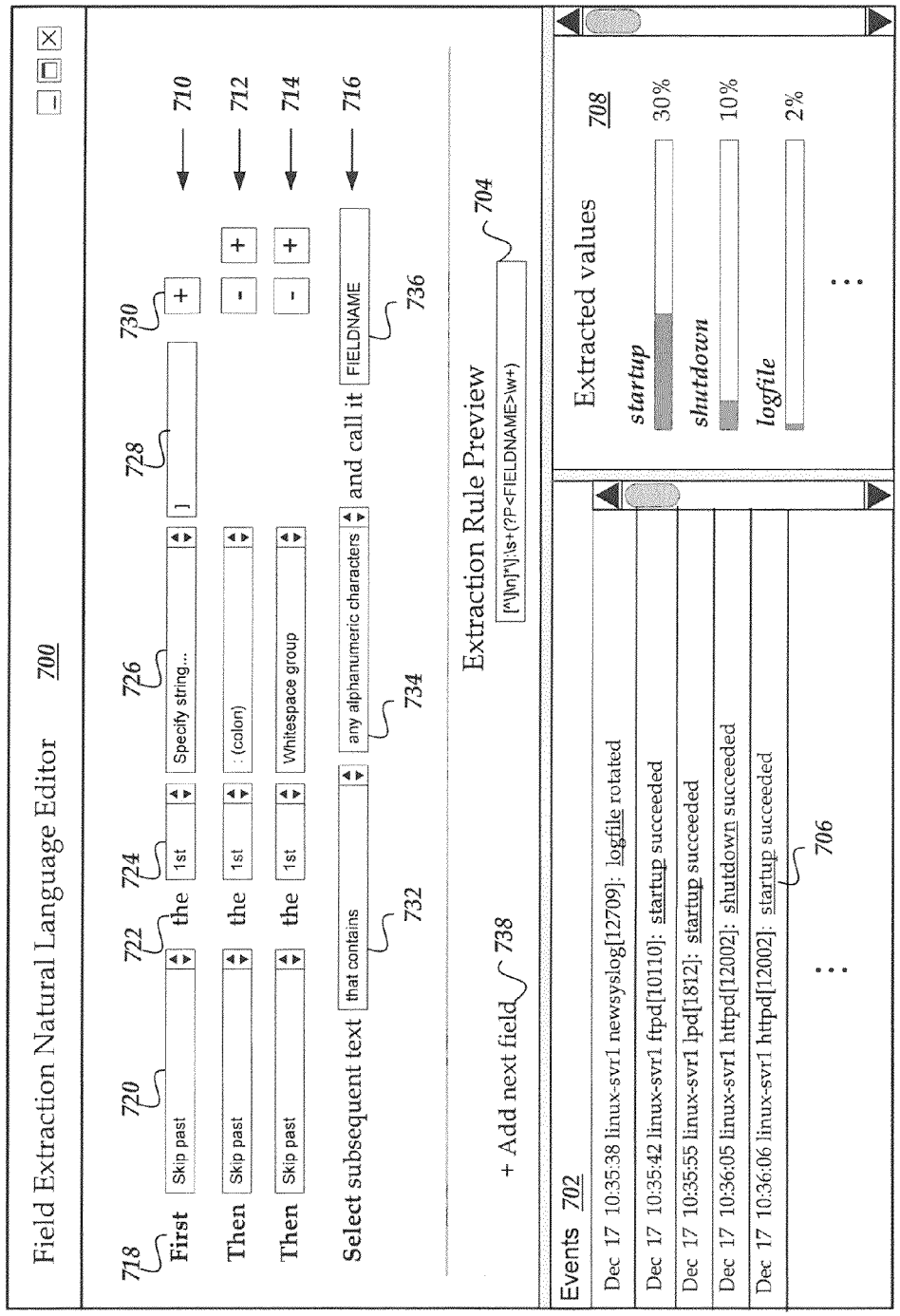
FIG. 7 shows a user-interface for natural language editing of extraction rules in accordance with at least one of the various embodiments.

FIG. 7 shows user-interface 700 for natural language editing of extraction rules in accordance with at least one of the various embodiments. In at least one of the various embodiments, a natural language application (e.g., natural language application 424, natural language application 284, or the like) may be arranged to enable users to create, edit, and/or modify extraction rules using natural language.

In at least one of the various embodiments, user interface 700 may include event window 702 for displaying at least of portion of the events that are being used for generating extraction rules. This window may show one or more rows of events. In some cases, well-known user interface elements, such as, as scroll bars may be included for enabling users to view additional events.

In at least one of the various embodiments, extraction rule preview 704 may be employed to display the "source code"

that corresponds to the extraction rule currently represented in the user-interface. In this example, extraction rule preview 704 shows source code of a regular expression, in at least one of the other various embodiments, extraction rules may be expressed using other pattern matching techniques. In at least one of the various embodiments, source code displayed in extraction rule preview 704 may be dynamically updated as natural language terms and/or expressions may be added, removed, or modified.

In at least one of the various embodiments, event field value 706 shows the portions of an event record that match the current extraction rule. In at least one of the various embodiments, if the matched portion corresponds with a know field data type it may be indicated. Likewise, in at least one of the various embodiments, window 708 may show additional metrics related the values extracted from the events using the current extraction rule.

In at least one of the various embodiments, natural language applications may enable users to modify extraction rules by providing a user interface that includes elements for mapping between natural language and extraction rule terms and expressions. In at least one of the various embodiments, extraction rules expressed in natural language may be comprised of one or more terms combined into expressions. Further, in at least one of the various embodiments, natural language expressions (comprised of one or more terms) may be combined to generate an extraction rule.

In at least one of the various embodiments, natural language user interfaces, such as, user interface 700 may include natural language expressions 710-716 with each expression including one or more user selectable inputs joined together with natural language connectors. Likewise, in at least one of the various embodiments, each natural language expression may be connected with natural language expression connectors (e.g., "First," "then," or the like). Further, the natural language elements available to expressions and the arrangement within each expression may vary depending on the computer language being employed to implement the extraction rule. In other words, the natural language options provided to the user may be tailored to the particular field extraction techniques being employed a particular extraction rule application.

Accordingly, user interface 700 is a non-limiting example for at least one of the various embodiments that may be directed to generating representations of regular expression in natural language. Consistent with the operation of regular expressions, a natural language application may enable a user to define one or more conditions that determine specific locations in the event. And, from those known positions capture rules may be applied to extract portions of the event that matches a given pattern. Thus, in this example, natural language expression connector 718 ("First") indicates the beginning of the extraction rule. Input 720 provides/displays natural language choices of the natural language operation that may be available. In this example, a user has selected a "skip past" operation. Next, comes natural language connector 722 ("the") followed by input 724. Here, input 724 provides the number of times to skip the matched portion of the event. Input 726 specifies how the expression match target may be identified. In this example, "Specify string . . . " is chosen. The specified string value is shown in field 728 (e.g. ']' a closing bracket). In this example, at the end of each expression a user interface element, such as, button 730, may enable a user to add more natural language expressions to the extraction rule. Read together, the first natural language expression of the extraction rule reads "First, skip past the first ']."

In this example, natural language expression 710 begins by expressing in natural language that the extraction rule application should generate extraction rules that include skipping past everything in an event (from the beginning of the event record) up until after the first closing bracket in the event is found. However, for this example, additional expressions have been added to further locate the desired capture position. Accordingly, another expression, expression 712 skips past the first colon (that comes after the first closing bracket located by expression 710). Further still, in this example, to locate the desired position in the events, expression 714 provides for skipping past the next white space group found in the event record.

Next, expression 716 may be employed to match the portion of the event that may be extracted. Reading input 732, input 734, and input 736 in sequence indicates that the extracted field should contain any unbroken sequence of alphanumeric characters, and that if qualifying sequence is found it should be assigned the name 'FIELDNAME'.

In at least one of the various embodiments, extraction rules may be defined to extract multiple fields from an event, in such cases, elements such as "Add next field" 738 may be provided.

Generalized Operation

FIGS. 8-11 represent the generalized operation of automatically generating extraction rules in accordance with at least one of the various embodiments.

Figure 8:
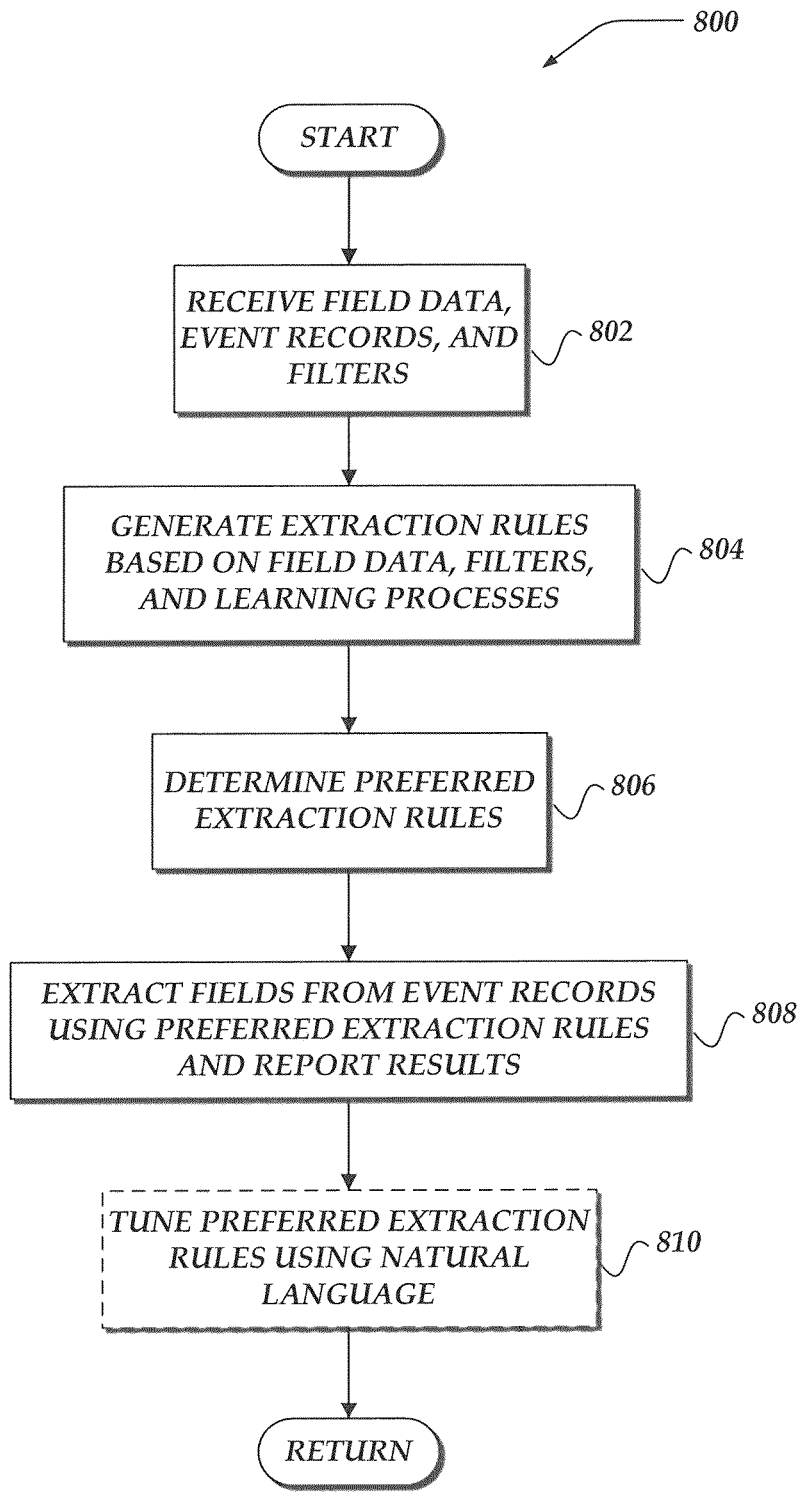
FIG. 8 shows a flowchart for a process for generating extraction rules in accordance with at least one of the various embodiments.

FIG. 8 shows a flowchart for process 800 for generating extraction rules in accordance with at least one of the various embodiments. After a start block, at block 802, in at least one of the various embodiments, field data, filters, and event records may be received. In at least one of the various embodiments, field data may include example data from an event record that may represent the fields the user may be interested in extracting.

At block 804, extraction rules may be generated based on the field data, filters, and one or more learning processes. In at least one of the various embodiments, learning processes may include one or more algorithms and heuristics applied to the event records and one or more candidate extraction rules. In at least one of the various embodiments, the learning processes may adapt dynamically based on the type of events being processed and/or the type of data being extracted.

At block 806, the preferred extraction rules may be determined. In at least one of the various embodiments, an extraction rule application may determine one or more preferred extraction rules using a scoring process that generates a quality score used for comparing and ranking extraction rules.

At block 808, one or more of the preferred extraction rules may be used to extract fields from the events. In at least one of the various embodiments, the results of the field extraction may be reported to the user.

In at least one of the various embodiments, the extraction results information may include information, such as, the field data types of matched (extracted results). Thus, in at least one of the various embodiments, a user-interface may display indicators showing the field data types that have been matched.

Optionally, at block 810, one or more of the extraction rules may be edited for improved performance using natural language. Next, in at least one of the various embodiments, control may be returned to a calling process.

Figure 9:
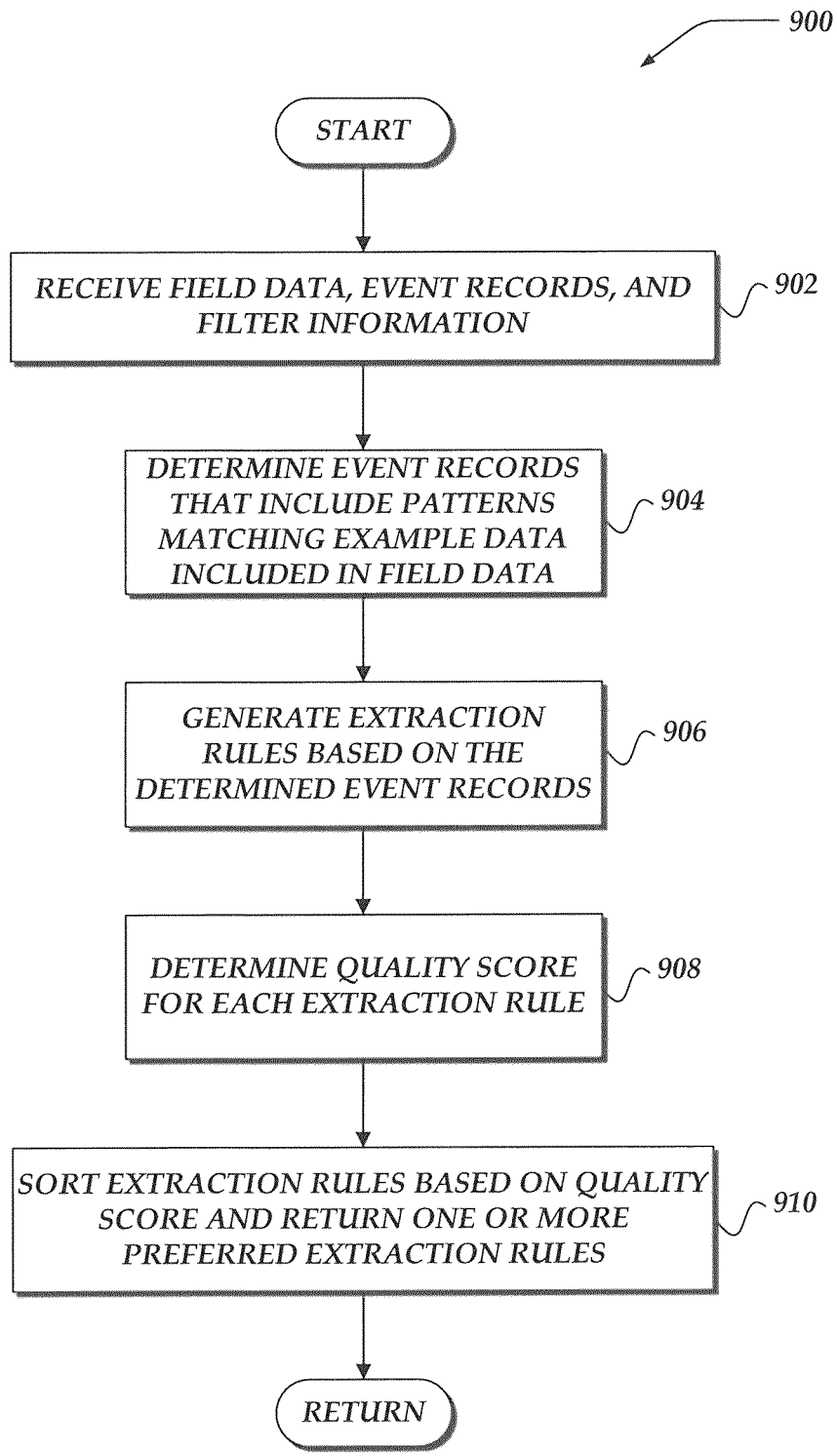
FIG. 9 shows a flowchart for a process for a learning extraction rules in accordance with at least one of the various embodiments.

FIG. 9 shows a flowchart for process 900 for learning extraction rules in accordance with at least one of the various embodiments. After a start block, at block 902, in at least one of the various embodiments, field data, event records, and (optionally) filter information may be received.

At block 904, the set of event records that include patterns that match the example data included with the field data may be determined. In at least one of the various embodiments, generally, these may be the event records that include at least one exact match of an example field value (e.g., a portion of the example data) included in the field data.

At block 906, extraction rules may be generated based on the set of events determined to match at least a portion of the example data. In at least one of the various embodiments, an extraction rule application may generate thousands of candidate extraction rules based on the field data and the event records that have been determined to include the example data. In at least one of the various embodiments, a configuration value may be employed to set an upper limit on the number of candidate extraction rules that may be generated (e.g., 100, 1000, 10000).

In at least one of the various embodiments, an extraction rule application may generate many (e.g., 10000) extraction rules (e.g., regular expressions) that may match the data in an event record that comes before the example data value. Likewise, extraction rules matching the data in the events coming after the example data may be generated. Also, extraction rules that match on the example data value may be generated. Further, in at least one of the various embodiments, extraction rules that combine two or more other rules may be generated. For example, in at least one of the various embodiments, two extraction rules, such as, an extraction rule that includes a regular expression that skips from the beginning of an event record to the example data value, and a extraction rule that includes another regular expression that matches the example data may be combined into a single extraction rule and scored as such.

In at least one of the various embodiments, if skipping to a particular location (index position) in an event, there may be one or more alternative rule expressions that resolve to the same location. Thus, in at least one of the various embodiments, extraction rules may be generated for one or more of the alternative ways. For example, to skip past "10:39:22 10.0.0.1 [", one could skip past: the "[" character, the 20th character; 3 periods, a space, and then "["; two whitespaces and then any character; or the like. Also, in at least one of the various embodiments, extraction rules may be generated for extracting multiple fields per event.

In at least one of the various embodiments, if filtering information is provided, some extraction rules may include the filtering information. For example, if the user provides filter information for matching events that may include the token "WARN", some of the candidate extraction rules generated to extract a field value may include a pattern to match the literal string "WARN" (e.g. "WARN"). Thus, these candidate extraction rules may match event records that include the exact (literal) string "WARN". Other candidate extraction rules may be generated to include matching expressions that match the characteristics of the filter information, such as, a pattern that matches capitalized strings (e.g., "[A-Z]+") which would match events that contain "WARN," "DEBUG," "ERROR," a pattern that matches the first two characters (e.g., "WA[A-Z]+"), or the like.

In at least one of the various embodiments, one or more extraction rules may be generated based on a location corresponding to a position within at least one event record. For example, the field data that include the example data may also include positional information, such as, the number of characters from the start of the event record to where the example data begins. In at least one of the various embodiments, this location information may be used to generate extraction rules that take into account the positional location of the example data.

At block 908, a quality score for each extraction rule may be determined. The quality score may be used for ranking the extraction rules. In at least one of the various embodiments, determining the quality score may include processing all of the received event records data rather than just the records that include an exact match with the example data value(s). For example, if a set of 1000 event records was provided, it may be that only ten event records included an exact match of the example data. Thus, these ten event records may be used for generating the candidate extraction rules. However, to determine quality scores for the extraction rules they may be executed on the 1000 event records rather than just the ten event records that were initially matched.

At block 910, the candidate extraction rules may be ranked and sorted based on the determined quality score and one or more of the preferred (higher scoring) extraction rules may be returned to a calling process.

Figure 10:
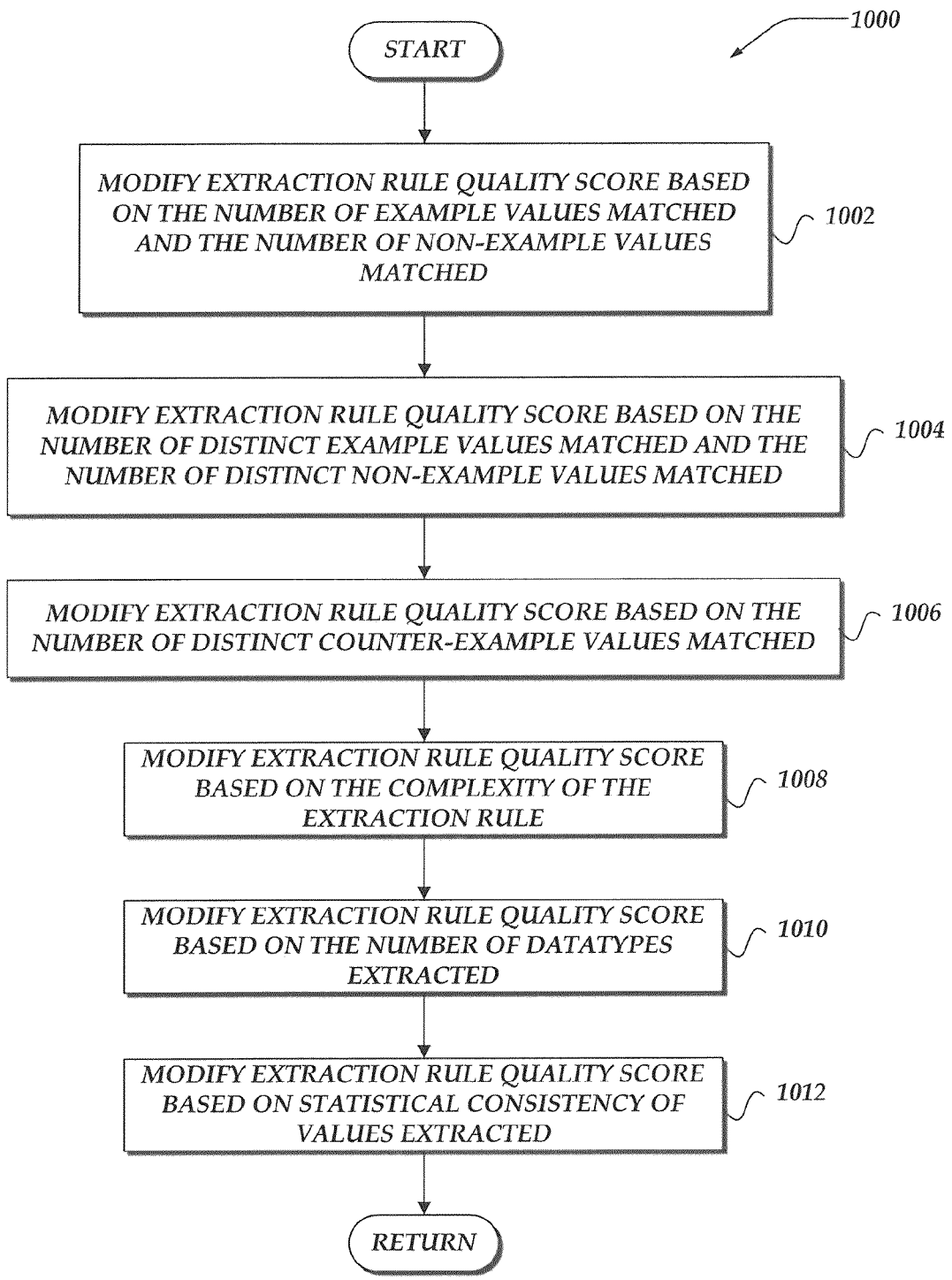
FIG. 10 shows a flowchart for a process for generating extraction rule quality scores in accordance with at least one of the various embodiments.

FIG. 10 shows a flowchart for process 1000 for determining quality scores for extraction rules in accordance with at least one of the various embodiments. After a start block, at block 1002, in at least one of the various embodiments, an extraction rule quality score may be modified based on the number of example data values matched. Also, in at least one of the various embodiments, the quality score may be modified based on the number of non-example values matched.

In at least one of the various embodiments, if a higher score reflects a better match, as the number of non-example values matched increases the quality score may be increased, up until a defined threshold of number of matches is met or exceeded. If the defined threshold is met or exceeded, matching additional non-example values may cause the quality score to be decreased as a penalty for having too many non-example matches. For example, if an extraction rule is designed to extract webserver names, the more non-example names the rule extracts the better, until a defined threshold, such as, twenty, is met or exceeded, at which point the quality score may be decreased as a penalty for extracting too many values to be trusted (i.e., the extraction rule might be extracting a timestamp or something else having many values). Accordingly, quality scores may improve as more example values are matched and as more non-example (unknown) values are matched—up until a defined threshold is met or exceeded where the quality scores are penalized for extracting too many non-example terms.

In at least one of the various embodiments, a defined threshold for penalizing extraction rules for matching too many non-examples may defined in a configuration file, set by a user, retrieved from database, or the like.

At block 1004, an extraction rule quality score may be modified based on the number of distinct example values matched. Also, in at least one of the various embodiments, the quality score may be modified based on the number of distinct non-example values matched.

In at least one of the various embodiments, if a higher quality score value reflects a better match, as the number of distinct non-example values matched increases, the quality score may be increased, up until a defined threshold of number of matches is met or exceeded. If the defined threshold is met or exceeded, matching additional distinct non-example values may cause the quality score to be decreased as a penalty for having too many distinct non-example matches. For example, if an extraction rule is designed to extract webserver names, the more distinct non-example names the rule extracts the better, until a defined threshold, such as, twenty, is met or exceeded, at which point the quality score may be decreased as a penalty for extracting too many values to be trusted (i.e., the extraction rule might be extracting a timestamp or something else having many values). Accordingly, quality scores may improve as more distinct example values are matched and as more distinct non-example (unknown) values are matched—up until a defined threshold is met or exceed where the quality scores are penalized for extracting too many distinct non-example terms.

In at least one of the various embodiments, a defined threshold for penalizing extraction rules for matching too many distinct non-examples may be defined in a configuration file, set by a user, retrieved from database, or the like.

At block 1006, an extraction rule quality score may be modified based on the number of distinct counter example values matched.

In at least one of the various embodiments, one or more distinct counter examples may be provided by a user after reviewing the fields extracted by one or more extraction rules. Also, in at least one of the various embodiments, distinct counter examples may be provided in the initial field data. For example, in at least one of the various embodiments, if the provided field data may include example data of "WARN" and counter examples of "111", "1234", or the like.

At block 1008, an extraction rule quality score may be modified based on a complexity of the extraction rule. In at least one of the various embodiments, the complexity may be defined to correlate with the size and/or length of a regular expression employed to implement the extraction rule. In at least one of the various embodiments, other methods of computing complexity be used, including, counting the number of subexpressions or character types included in regular expressions that may comprise the extraction rule. Also, in at least one of the various embodiments, factors such as time to execute, resident (computer) memory space used if executing the rule, processor time/resources consumed if executing the rule, or the like, may be employed to determine a complexity of the extraction rule.

At block 1010, an extraction rule quality score may be modified based on the number of known field data types extracted by the rule. In at least one of the various embodiments, extraction rules that extract one or more fields corresponding to known field data types may be scored higher than extraction rules that extract fewer fields corresponding to known field data types.

In at least one of the various embodiments, the quality score for an extraction rule that extracts fields may be increased if, for each field extracted, the extracted values have consistent datatypes. For example, given an extraction rule that extracts a field called cellphone and a field called zipcode, the extraction rule quality score will be increased if the values for cellphone comprise fewer datatypes (ideally one datatype, such as phonenumber) and the values of zipcode also comprise fewer datatypes (e.g. integer). An extraction rule that extracts out "bob" and "123" for the zipcode field should score lower/badly because it has extracted a "word" datatype and an integer datatype. Accordingly, extraction rule quality scores may be increased for consistency of datatype of extracted values for a field. At block 1012, an extraction rule quality score may be modified based on the statistical consistency of values extracted by the rule. In at least one of the various embodiments, statistical metrics such as mean, median, standard deviation, or the like, may be applied to the length of the values of the extracted fields. Extraction rules that extract values for fields are more statistically consistent may be scored higher than extraction rules that extract statistically inconsistent field values. In at least one of the various embodiments, if the extraction rule quality score is computed, control may be returned to a calling process.

In at least one of the various embodiments, the relative importance/impact of a scoring method may be weighted. Further, in at least one of the various embodiments, the relative importance/impact of a scoring method may be dynamically adjusted based on feedback from a user reviewing the extraction results. For example, an extraction rule application may erroneously be increasing the score of extraction rules based on consistency when the user is deliberately targeting data fields having inconsistent properties. Thus, based on counter examples that include inconsistent properties, the weight that "statistical consistency" contributes to determining a quality score may be decreased.

One of ordinary skill in the art will appreciate that the steps in depicted in FIG. 10 can be executed in any order and any one of them may be omitted additional reasonable heuristics can be used without departing from the scope of the claimed innovations. However, the steps depicted for process 1000 are at least sufficient for disclosing the various embodiments and innovations herein.

Figure 11:
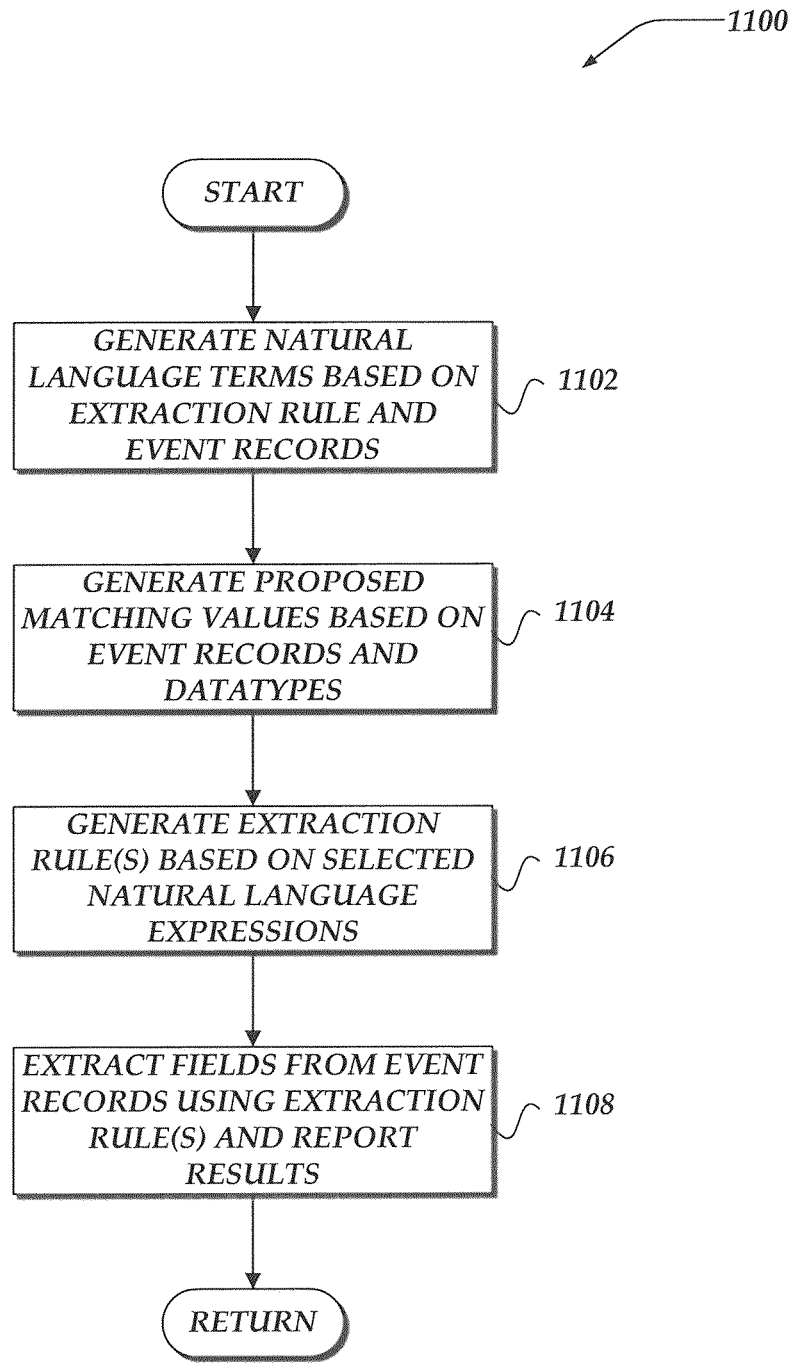
FIG. 11 shows a flowchart for a process for editing extraction rules using natural language in accordance with at least one of the various embodiments.

FIG. 11 shows a flowchart for process 1100 for generating extraction rules using natural language in accordance with at least one of the various embodiments. After a start block, at block 1102, in at least one of the various embodiments, natural language terms, such as, modifiers, connectors, inputs, or the like may be generated.

In at least one of the various embodiments, one or more natural language elements that correspond to extraction rule actions may be arranged into arbitrarily long sequences for performing field extractions. In at least one of the various embodiments, user-interface dropdown lists that include relevant natural language terms may be employed to create and/or modify an extraction rule. In at least one of the various embodiments, the contents of the dropdown lists may vary depending on based on the extraction rule being modified and the event records.

In at least one of the various embodiments, the natural language terms may be pre-selected and arranged in natural language expression based on a previously generated extraction rule. This may enable users to use natural language to modify an extraction rule that was automatically generated. Also, in at least one of the various embodiments, users may create extraction rules directly from selected natural language terms and expressions rather than be limited to editing a previously generated extraction rule.

At block 1104, proposed matching values may be generated based on the event records and/or field data types. In at least one of the various embodiments, the various values proposed for matching may be presented in a user-interface. The particular values may be sorted based on the likelihood that the values may be employed in an extraction rule. In at least one of the various embodiments, the likelihood may be determined based on if a value is in one or more of the event records. For example, if multiple event records include colons a value ": (colon)" may be pre-loaded into the dropdown lists. Likewise, if the event records include recognized field data types (e.g., URL, email address, telephone number, or the like) those field data types may be made available in the drop down lists. Also, in at least one of the various embodiments, the order of how the natural language elements are shown in dropdown lists may be correlated with the likelihood that the element may be chosen.

Also, in at least one of the various embodiments, a user interface may be provided that enables a user to specify a character pattern. See, FIG. 7, input 726 and input 728.

At block 1106, natural language expressions comprised of the selected natural language terms may be employed to generate one or more extraction rules. In at least one of the various embodiments, the natural language expressions may be converted into the corresponding extraction rule source code (e.g., regular expression).

At block 1108, the generated extraction rules may be used extract fields from the event records and results may be reported. In at least one of the various embodiments, if natural language editing may be complete, control may be returned to a calling process.

In at least one of the various embodiments, the dropdown lists and/or alternative user-interface elements may include natural language terms, such as, "skip past", "skip before", "start selecting text", "whitespace", "various punctuation characters", "custom string", "custom regular expression", "that contains", "through", "up to but not including", "whitespace", "alphanumeric characters", "letters", "digits", "an integer", "floating point number", "IPv4 address", "email address", "custom string", or the like. Further, in at least one of the various embodiments, the dropdown lists/user-interface may include one or more other user defined datatypes.

In at least one of the various embodiments, a natural language application may insert context sensitive natural language connecting terms in between the user selectable elements, such as, 'the', 'First', 'then', or the like.

For example, an extraction rule that extracts two fields may have the following natural language representation:

"skip past" the "1st" "whitespace" group selecting text "up to but not including" any "whitespace" and call it "my_ip" then "skip after" the "2nd" "[(left bracket)" selecting text "through" any "letters" and call it "my_host"

This natural language expression may be employed by a natural language application to generate a regular expression based extraction rule, such as:

"\s*(?<my_ip>\S+)(?:[^[ ]*\[) {2}(?<my_host>[a-z]*)"

Thus, if given a sample event of "192.168.0.1 internal [1234][mywebserver]" the regular expression will extract out the following two values 'my_ip="192.168.0.1"' and 'my_host="mywebserver"'.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A computer-implemented method comprising:
accessing in memory a set of events, each event identified by an associated time stamp;
wherein each event in the set of events includes a portion of raw data from machine data;
transmitting for display a user interface including a first event and a plurality of second events of the set of events;
receiving data indicating a selection of a portion of text within the first event;
automatically determining a field extraction rule that extracts as a value of a field the selection of the portion of text within the first event when the field extraction rule is applied to the first event; and
transmitting for display an updated user interface that includes the second events and that indicates, for each of the second events, a value of the field for each second event that would be extracted by applying the extraction rule to the second event.

2. A network device that is operative for generating extraction rules, comprising:
including:
a transceiver that is operative to communicate over a network;
a memory that is operative to store at least instructions; and
a processor device that is operative to execute instructions that enable actions, including:
accessing in memory a set of events, each event identified by an associated time stamp;
wherein each event in the set of events includes a portion of raw data from machine data;
transmitting for display a user interface including a first event and a plurality of second events of the set of events;
receiving data indicating a selection of a portion of text within the first event;
automatically determining a field extraction rule that extracts as a value of a field the selection of the portion of text within the first event when the field extraction rule is applied to the first event; and
transmitting for display an updated user interface that includes the second events and that indicates, for each of the second events, a value of the field for each second event that would be extracted by applying the extraction rule to the second event.

3. A processor readable non-transitive storage media that includes instructions for generating extraction rules over a network, wherein execution of the instructions by a processor device enables actions, comprising:
accessing in memory a set of events, each event identified by an associated time stamp;
wherein each event in the set of events includes a portion of raw data from machine data;
transmitting for display a user interface including a first event and a plurality of second events of the set of events;
receiving data indicating a selection of a portion of text within the first event;
automatically determining a field extraction rule that extracts as a value of a field the selection of the portion of text within the first event when the field extraction rule is applied to the first event; and
transmitting for display an updated user interface that includes the second events and that indicates, for each of the second events, a value of the field for each second event that would be extracted by applying the extraction rule to the second event.

4. A system that is arranged for generating extraction rules over a network, comprising:
a server device, including:
a transceiver that is operative to communicate over the network;
a memory that is operative to store at least instructions; and
a processor device that is operative to execute instructions that enable actions, including:
accessing in memory a set of events, each event identified by an associated time stamp;
wherein each event in the set of events includes a portion of raw data from machine data;

transmitting for display a user interface including a first event and a plurality of second events of the set of events;
receiving data indicating a selection of a portion of text within the first event;
automatically determining a field extraction rule that extracts as a value of a field the selection of the portion of text within the first event when the field extraction rule is applied to the first event; and
transmitting for display an updated user interface that includes the second events and that indicates, for each of the second events, a value of the field for each second event that would be extracted by applying the extraction rule to the second event.

5. The method of claim 1, wherein the first event includes machine data.

6. The method of claim 1, wherein the first event includes unstructured data.

7. The method of claim 1, wherein storing the plurality of events includes indexing each event of the plurality of events.

8. The method of claim 1, further comprising:
receiving an indication that a desired value of the field for the second event does not comprise the indicated value of the field for the second event;
modifying the field extraction rule such that the modified field extraction rule would extract the selection of the portion of text when the field extraction rule is applied to the first event and would extract a value of the field for the second event that is different from the indicated value of the field for the second event when the field extraction rule is applied to the second event.

9. The method of claim 1, further comprising:
receiving a selection of a portion of text within the second event;
modifying the field extraction rule such that the modified field extraction rule would extract the selection of the portion of text within the first event when the modified field extraction rule is applied to the first event and would extract the selection of the portion of text within the second event when the modified field extraction rule is applied to the second event.

10. The method of claim 1, wherein the field extraction rule comprises a regular expression.

11. The method of claim 1, further comprising:
displaying natural language representing the field extraction rule;
receiving an edit to the natural language;
determining a modified field extraction rule corresponding to the edited natural language; and
determining values for the field corresponding to the modified field extraction rule.

12. The method of claim 1, further comprising determining a data type of the selection of the portion of text within the first event, and wherein determining the field extraction rule that extracts as the value of the field the selection of the portion of text within the first event comprises determining that the field extraction rule would extract a value comprising the data type as the value of the field for at least one other event.

13. The network device of claim 2, wherein the first event includes machine data.

14. The network device of claim 2, wherein the first event includes unstructured data.

15. The network device of claim 2, wherein storing the plurality of events includes indexing each event of the plurality of events.

16. The network device of claim 2, wherein the actions further comprise:
receiving an indication that a desired value of the field for the second event does not comprise the indicated value of the field for the second event;
modifying the field extraction rule such that the modified field extraction rule would extract the selection of the portion of text when the modified field extraction rule is applied to the first event and would extract a value of the field for the second event that is different from the indicated value of the field for the second event when the modified field extraction rule is applied to the second event.

17. The network device of claim 2, wherein the actions further comprise:
receiving a selection of a portion of text within the second event;
modifying the field extraction rule such that the modified field extraction rule would extract the selection of the portion of text within the first event when the field extraction rule is applied to the first event and would extract the selection of the portion of text within the second event when the field extraction rule is applied to the second event.

18. The network device of claim 2, wherein the field extraction rule comprises a regular expression.

19. The network device of claim 2, wherein the actions further comprise:
displaying natural language representing the field extraction rule; receiving an edit to the natural language;
determining a modified field extraction rule corresponding to the edited natural language; and
determining values for the field corresponding to the modified field extraction rule.

20. The network device of claim 2, wherein the actions further comprise determining a data type of the selection of the portion of text within the first event, and wherein determining the field extraction rule that extracts as the value of the field the selection of the portion of text within the first event comprises determining that the field extraction rule would extract a value comprising the data type as the value of the field for at least one other event.

21. The media of claim 3, wherein the first event includes machine data.

22. The media of claim 3, wherein the first event includes unstructured data.

23. The media of claim 3, wherein storing the plurality of events includes indexing each event of the plurality of events.

24. The media of claim 3, wherein the actions further comprise:
receiving an indication that a desired value of the field for the second event does not comprise the indicated value of the field for the second event;
modifying the field extraction rule such that the modified field extraction rule would extract the selection of the portion of text when the modified field extraction rule is applied to the first event and would extract a value of the field for the second event that is different from the indicated value of the field for the second event when the modified field extraction rule is applied to the second event.

25. The media of claim 3, wherein the actions further comprise:
receiving a selection of a portion of text within the second event;
modifying the field extraction rule such that the modified field extraction rule would extract the selection of the portion of text within the first event when the modified field extraction rule is applied to the first event and would extract the selection of the portion of text within the second event when the modified field extraction rule is applied to the second event.

26. The media of claim 3, wherein the field extraction rule comprises a regular expression.

27. The media of claim 3, wherein the actions further comprise:
   displaying natural language representing the field extraction rule; receiving an edit to the natural language;
   determining a modified field extraction rule corresponding to the edited natural language; and
   determining values for the field corresponding to the modified field extraction rule.

28. The media of claim 3, wherein the actions further comprise determining a data type of the selection of the portion of text within the first event, and wherein determining the field extraction rule that extracts as the value of the field the selection of the portion of text within the first event comprises determining that the field extraction rule would extract a value comprising the data type as the value of the field for at least one other event.

29. The system of claim 4, wherein the first event includes machine data.

30. The method of claim 1, further comprising:
   receiving an indication that a value is to serve as a counter example for the field; and
   modifying the field extraction rule to bias against identifying the counter-example value as a value for the field.

* * * * *

UNITED STATES PATENT AND TRADEMARK OFFICE
CERTIFICATE OF CORRECTION

PATENT NO. : 8,909,642 B2  
APPLICATION NO. : 13/748306  
DATED : December 9, 2014  
INVENTOR(S) : Carasso et al.

Page 1 of 1

It is certified that error appears in the above-identified patent and that said Letters Patent is hereby corrected as shown below:

In the Claims,

In column 25, lines 14-15, delete claim 5.  
In column 25, lines 19-20, delete claim 7.  
In column 25, lines 59-60, delete claim 13.  
In column 25, lines 63-65, delete claim 15.  
In column 26, lines 42, 43, delete claim 21.  
In column 26, lines 46-47, delete claim 23.

Signed and Sealed this  
Fourth Day of August, 2015

Michelle K. Lee  
*Director of the United States Patent and Trademark Office*

UNITED STATES PATENT AND TRADEMARK OFFICE
CERTIFICATE OF CORRECTION

| | |
|---|---|
| PATENT NO. | : 8,909,642 B2 |
| APPLICATION NO. | : 13/748306 |
| DATED | : December 9, 2014 |
| INVENTOR(S) | : Carasso et al. |

It is certified that error appears in the above-identified patent and that said Letters Patent is hereby corrected as shown below:

On the Title page, under abstract "30 Claims, 12 Drawing Sheets" should read --24 Claims, 12 Drawing Sheets--.

In the Claims,

In column 25, lines 14-15, delete claim 5.
In column 25, lines 19-20, delete claim 7.
In column 25, lines 59-60, delete claim 13.
In column 25, lines 63-65, delete claim 15.
In column 26, lines 42, 43, delete claim 21.
In column 26, lines 46-47, delete claim 23.

This certificate supersedes the Certificate of Correction issued August 4, 2015.

Signed and Sealed this
Eighth Day of September, 2015

Michelle K. Lee
*Director of the United States Patent and Trademark Office*